Oct. 5, 1965
K. H. MACHER
3,209,649
WIDE-ANGLE CAMERA OBJECTIVE CONSISTING OF FOUR AIR-SPACED MEMBERS
Filed Feb. 15, 1962
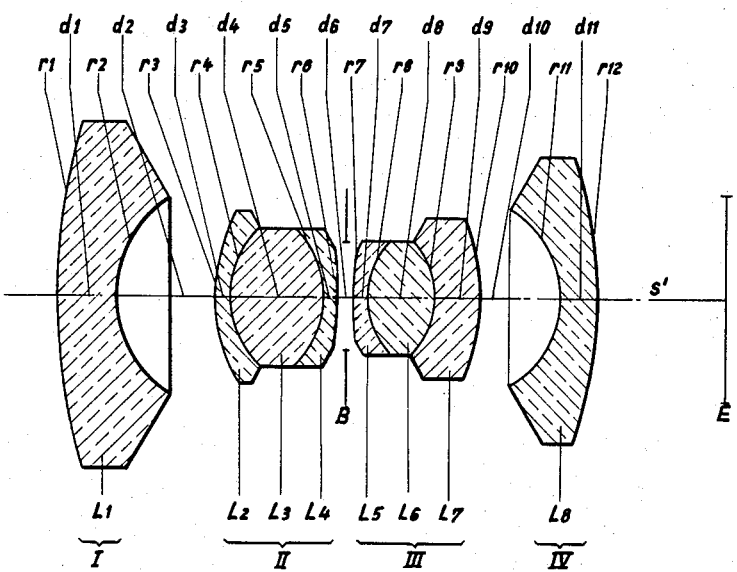
Inventor:
Karl Heinrich Macher
by Karl F. Ross
AGENT

United States Patent Office 3,209,649
Patented Oct. 5, 1965

3,209,649
WIDE-ANGLE CAMERA OBJECTIVE CONSISTING OF FOUR AIR-SPACED MEMBERS
Karl Heinrich Macher, Bad Kreuznach, Rhineland, Germany, assignor to Firma Jos. Schneider & Co., Optische Werke, Bad Kreuznach, Rhineland, Germany, a company of Germany
Filed Feb. 15, 1962, Ser. No. 173,409
Claims priority, application Germany, Mar. 8, 1961, Sch 29,349
3 Claims. (Cl. 88—57)

My present invention relates to an optical objective system designed for high-quality image projection upon a relatively wide area.

In commonly owned U.S. Patent No. 2,781,695, issued February 19, 1957 to G. Klemt, there has been disclosed an objective system with an image angle of about 100°; the system consists of four air-spaced lens members including an inner pair of collective members and an outer pair of dispersive members bracketing the inner pair, these components being positioned substantially symmetrically around a diaphragm space enclosed by the members of the inner pair. With this prior system, however, the relative aperture is limited to a ratio of 1:8.

An improved objective system of this general type has been disclosed and claimed in U.S. Patent No. 2,897,725, issued August 4, 1959 to the aforesaid G. Klemt and me; the latter system, in which the meniscus-shaped singlets constituting the outer members of the earlier disclosure are replaced by doublets, affords an aperture ratio of 1:4.

It is the object of my present invention to provide a still further improved system of this general type with even larger relative aperture and an angle of view not less than 90°.

A more particular object of this invention is to provide an objective system with the aforestated characteristics which is substantially fully corrected for spherical, chromatic and comatic aberrations as well as for field curvature.

These objects are realized in accordance with my present invention, in a photographic or cinematographic camera objective with four air-spaced components generally as disclosed in the two above-identified patents, by the construction of each inner member (i.e. each component adjacent the diaphragm space) as a triplet with an inner negative lens, an intermediate positive lens and an outer negative lens, the three lenses being made of glasses with progressively increasing refracting indices from the diaphragm space outwardly.

In a preferred embodiment, in which the two outer members are meniscus-shaped singlets turning their more strongly curved surfaces toward the inner pair, the refractive index of the outer negative lens of each triplet exceeds that of the inner negative lens thereof by a minimum of about 0.12 units and that of the adjoining positive lens by a minimum of substantially 0.08 units. This relationship has been found to give a particularly good correction for coma which normally represents a rather vexing problem with large aperture ratios.

I have further found that good chromatic correction with maintenance of sharp definition and contrast is realizable if the Abbé numbers $\nu$ of the outer negative lens and the positive lens of the rear triplet, i.e. the one following the diaphragm space as viewed from the side of the longer light rays, exceed the Abbé numbers of the corresponding lenses of the front triplet by at least 8 units.

For the suppression of field curvature and astigmatism it is preferred that the exposed surfaces of the inner negative lenses of the two triplets, i.e. those facing the diaphragm space, be given a certain convexity; spherical zonal aberrations can be minimized if the forward meniscus, i.e. the front component of the system, has radii of curvature whose reciprocal values are in a ratio of at most 0.2:1, i.e. wherein the longer front radius of curvature equals at least five times the shorter rear radius.

The sole figure of the accompanying drawing illustrates diagrammatically an embodiment of the invention exhibiting the above features.

The figure shows a first dispersive member I consisting of a single meniscus-shaped lens L1 with radii $r1$, $r2$ and thickness $d1$, separated by an air space $d2$ from the first collective component II. The latter is a triplet composed of an outer negative lens L2 (radii $r3$, $r4$ and thickness $d3$), a positive lens L3 (radii $r4$, $r5$ and thickness $d4$) and an inner negative lens L4 (radii $r5$, $r6$ and thickness $d5$) adjoining a diaphragm space $d6$ with diaphragm B. Beyond this diaphragm space there is positioned a collective rear triplet III composed of an inner negative lens L5 (radii $r7$, $r8$, thickness $d7$), a positive lens L6 (radii $r8$, $r9$ and thickness $d8$) and an outer negative lens L7 (radii $r9$, $r10$, thickness $d9$). Separated from this triplet by an air space $d10$ is a rear dispersive member IV again consisting of a single meniscus-shaped lens L8, with radii $r11$, $r12$ and thickness $d11$. The vertex of the outer surface of lens L8 is spaced from the image plane E by the back-focal length $s'$.

The parameters $r1$ to $r12$ and $d1$ to $d11$, the indices of refraction $n_d$ and the Abbé numbers $\nu$ of lenses L1 to L8 may have numerical values as given in the following table, the latter representing an objective system having an aperture ratio of 1:3.4, an overall focal length of numerical value 100, a back-focal length $s'=39.0$ and a field angle of 90:

Table

| | | | | $n_d$ | $\nu$ |
|---|---|---|---|---|---|
| I | L1 | $r1=+234.94$ | $d1=24.53$ | 1.52249 | 59.64 |
| | | $r2=+42.02$ | $d2=37.10$ | Air space | |
| II | L2 | $r3=+61.73$ | $d3=7.25$ | 1.72372 | 38.09 |
| | L3 | $r4=+34.17$ | $d4=36.50$ | 1.60729 | 49.25 |
| | L4 | $r5=-35.23$ | $d5=4.90$ | 1.56013 | 47.03 |
| | | $r6=-270.56$ | $d6=8.27$ | Air space (diaphragm) | |
| III | L5 | $r7=+318.75$ | $d7=4.62$ | 1.56732 | 42.82 |
| | L6 | $r8=+29.20$ | $d8=26.20$ | 1.62299 | 58.12 |
| | L7 | $r9=-28.48$ | $d9=18.39$ | 1.71700 | 47.90 |
| | | $r10=-78.50$ | $d10=31.37$ | Air space | |
| IV | L8 | $r11=-37.98$ | $d11=14.65$ | 1.54072 | 47.22 |
| | | $r12=-165.40$ | $d_{total}=213.78$ | | |

As will be noted from the foregoing table, the inner and outer negative lenses (L4, L5; L2, L7) and the positive lenses (L3, L6), sandwiched therebetween, of the two collective triplets II and III are made of glasses whose refractive indices increase progressively from the innermost lens outwardly; more particularly, the indices $n_d$ of lenses L2 and L7 exceed those of lenses L4 and L5 by more than 0.12 and those of lenses L3 and L6 by more than 0.08 units. It will also be seen that the outer negative lens L7 and the positive lens L6 of rear triplet III have Abbé numbers $\nu$ which exceed those of the corresponding lenses L2, L3 of front triplet II by more than 8 units. The ratio of the radii $r1$ and $r2$ of front meniscus L1 is greater than 5:1.

Departures from the exact structure herein disclosed and especially from the specific numerical values given in the foregoing table are of course possible and are deemed to come within the spirit and scope of the invention as defined in the appended claims.

I claim:

1. An optical objective system with an overall focal length of numerical value 100, consisting of four air-spaced members including an inner pair of collective members enclosing a diaphragm space and an outer pair of dispersive members encompassing said inner pair, said dispersive members being meniscus-shaped single front and rear lenses and turning their more strongly curved surfaces toward said inner pair, said collective members being constituted by a front triplet and a rear triplet each composed of a positive lens sandwiched between an inner negative lens adjacent said diaphragm space and an outer negative lens remote from said diaphragm space, the radii $r1$ to $r12$ of said single front lens L1, said outer negative lens L2 of said front triplet, said positive lens L3 of said front triplet, said inner negative lens L4 of said front triplet, said inner negative lens L5 of said rear triplet, said positive lens L6 of said rear triplet, said outer negative lens L7 of said rear triplet and said single rear lens L8, the axial thicknesses and spacings $d1$ to $d11$ of said lenses, their indices of refraction $n_d$ and their Abbé numbers $\nu$ having numerical values substantially as given in the following table:

Table

|  |  |  | $n_d$ | $\nu$ |
|---|---|---|---|---|
| L1 | r1=+234.94 | | | |
| | r2=+42.02 | d1=24.53 | 1.52249 | 59.64 |
| | | d2=37.10 | Air space | |
| L2 | r3=+61.73 | d3=7.25 | 1.72372 | 38.09 |
| | r4=+34.17 | | | |
| L3 | | d4=36.50 | 1.60729 | 49.25 |
| | r5=−35.23 | | | |
| L4 | | d5=4.90 | 1.56013 | 47.03 |
| | r6=−270.56 | | | |
| | | d6=8.27 | Air space (diaphragm) | |
| | r7=+318.75 | | | |
| L5 | | d7=4.62 | 1.56732 | 42.82 |
| | r8=+29.20 | | | |
| L6 | | d8=26.20 | 1.62299 | 58.12 |
| | r9=−28.48 | | | |
| L7 | | d9=18.39 | 1.71700 | 47.90 |
| | r10=−78.50 | | | |
| | | d10=31.37 | Air space | |
| L8 | r11=−37.98 | d11=14.65 | 1.54072 | 47.22 |
| | r12=−165.40 | | | |
| | | dtotal=213.78 | | |

2. A wide-angle optical objective system consisting of four air-spaced members composed of a total of eight lenses, said members being a first outer dispersive singlet, a first collective triplet separated by a negatively refracting forward air space from said first singlet, a second collective triplet enclosing with said first triplet a positively refracting diaphragm space, and a second outer dispersive singlet separated from said second triplet by a negatively refracting rear air space; said dispersive members being meniscus-shaped and turning their more strongly curved surfaces toward said triplets, said first singlet having an outer surface with a radius of curvature equal to at least five times the radius of its inner surface for minimizing spherical zonal aberrations; each of said triplets being composed of a biconvex positive lens sandwiched between a meniscus-shaped inner negative lens adjacent said diaphragm space and a meniscus-shaped outer negative lens remote from said diaphragm space, the refractive indices of said inner negative lens, said positive lens and said outer negative lens progressively increasing in magnitude within each triplet from said diaphragm space outwardly for correction coma at large aperture ratios, the refractive index of said outer negative lens exceeding that of said inner negative lens by a minimum of substantially 0.12 units and that of said positive lens by a minimum of substantially 0.08 units within each triplet, said inner negative lenses having confronting convex surfaces for suppressing field curvature and astigmatism.

3. An optical objective system as defined in claim 2 wherein said outer negative lens and said positive lens of said rear triplet have Abbé numbers respectively exceeding those of the corresponding lenses of said front triplet by a minimum of substantially 8 units.

References Cited by the Examiner
UNITED STATES PATENTS

| 2,734,424 | 2/56 | Bertele | 88—57 |
| 2,781,695 | 2/57 | Klemt | 88—57 |
| 2,845,845 | 8/58 | Baluteau | 88—57 |
| 2,897,725 | 8/59 | Klemt et al. | 88—57 |

JEWELL H. PEDERSEN, *Primary Examiner.*